March 18, 1969 S. MARINO 3,432,957

FISH LURE

Filed Feb. 9, 1966

INVENTOR

SANTO MARINO

BY Frank B. Hill

ATTORNEY

United States Patent Office 3,432,957
Patented Mar. 18, 1969

3,432,957
FISH LURE
Santo Marino, 604 Rountree Road,
Hanover, Mich. 49241
Filed Feb. 9, 1966, Ser. No. 526,312
U.S. Cl. 43—17.1 8 Claims
Int. Cl. A01k 85/04

ABSTRACT OF THE DISCLOSURE

A fish lure for either underwater or surface use including a spinner member, a fish hook assembly connected to the spinner member, and a means to attach the spinner member to a fishing line. The spinner member is formed as a spoon member having a first and second trailing fin member. Each fin member has a scoop portion and a flange portion. The fin members are in diverging relationship with respect to each other in a direction away from the spoon member and the scoop portions of the fin members blend in with the said spoon member.

*Background of the invention*

It has been a continual object of man to increase his skill and efficiency in acquiring food. One of man's earliest food acquiring endeavors was fishing. At the present time fishing has been channeled into two broad areas, generally referred to as commercial fishing and sport fishing. Sport fishing has increased over the years but commercial fishing has actually decreased, in that it consumes a smaller percentage of the populace's time and energies. In sport fishing man has endeavored to provide himself with lures which give him enjoyment in attracting fish and pride by not removing the sport from the catch.

Over the years there has been a variety of forms, shapes, colors, et cetera, of fish lures. It has been the general experience that certain lures have been developed for one specific fishing activity, which limits the use and application of the lure. Some fishing lures have been designed to attract the fisherman with no or limited consideration given to catching the fish.

A consideration in design of fish lure equipment in both the sporting and commercial areas has been to provide equipment which will lure fish to the bait without violating the spirit of sportmanship and/or fair practice required in such activities. It was a recognition of these problems and the shortcomings in presently available commercial devices which led to the conception and development of the present invention.

*Summary of the invention*

Accordingly, among the objects of the present invention is to provide a simple and inexpensive fish lure which will easily and naturally move through the water attracting the attention of fish.

Another object of the present invention is to provide a novel fish lure which can be used either as an underwater or surface lure, depending upon the manner in which the user wishes to use the lure.

A further object of the present invention is to provide a fish lure which can either be part of the fishing line and receive the pull of a caught fish or which can be independent of the fish line and spin and not receive the direct pull of a fish caught by it.

A further object of the present invention is to provide a fish lure having a spinner member with a spoon-shaped scoop and a bifurcated end portion, with one portion of the bifurcated end having a continuous curve in conformity with the curvature of the spoon-shaped scoop and the other bifurcated end portion curved in the opposite direction. A further object of the present invention is to provide a fish lure having a series of openings or holes through its main portion which send out sonic waves which assist in attracting fish.

A further object of the present invention is to provide a fish lure with a bifurcated end member which includes scooped fins which send out sonic waves which assist in attracting fish.

A further object of the present invention is to provide a fish lure with an end portion having scooped fin members which will rotate in such a manner that the fins will provide a slapping sound on the water surface creating both turbulence and sonic waves to assist in attracting fish.

A further object of the present invention is to provide a fish lure with a spinner member having a spoon body, a bifurcated scoop fin portion and a fishhook attaching means which positions the fishhook out of contact with the spinner member.

A further object of the present invention is to provide a fish lure having a spinner member with a spoon body and a bifurcated end portion in the shape of two scooped fins, and the spinner member causing the fish lure to move through the water in a very smooth and natural manner and in substantially a straight path.

A further object of the present invention is to provide a fish lure having a spinner member with a spoon-shaped main body portion and sonic holes through its main portion and a finned rear portion which produce a combination sonic wave with the sonic holes to attract fish.

Still further objects and advantages of the present invention will appear as the description proceeds.

*Brief description of drawings*

To the accomplishment of the foregoing and related ends, the invention, then, consists of the special fish lure hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing.

*Brief description of specific embodiments*

Figure 1:
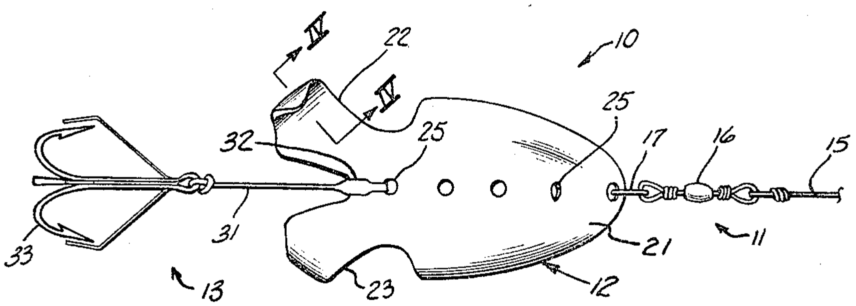
FIGURE 1 is a top plan view showing one form of the fish lure in accordance with the principles of the present invention.
Figure 2:
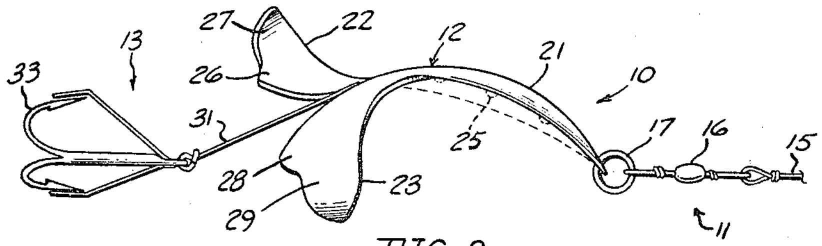
FIGURE 2 is a side elevational view of the fish lure embodiment disclosed in FIGURE 1.

Referring generally to FIGURES 1 and 2, the invention is there shown exemplified in a novel fish lure 10 having a swivel attachment 11, a spinner member 12 and a fishhook assembly 13. The fish lure 10 is secured to a fishing line or leader 15 by the swivel attachment 11. The swivel attachment 11 has a swivel member 16 which permits the fish lure 10 to turn or perform a spinning movement independent of the fishing line 15. Ring 17 is part of the swivel attachment 11 and connects it to the spinner member 12. The spinner member 12 has a major body portion which is indicated as curved spoon 21 and two tail portions generally referred to as fins 22 and 23. In a preferred embodiment, the spoon 21 has holes 25 extending substantially along its midportion. The purpose and function of these holes will be explained in more detail below.

Figures 3, 4, 5:
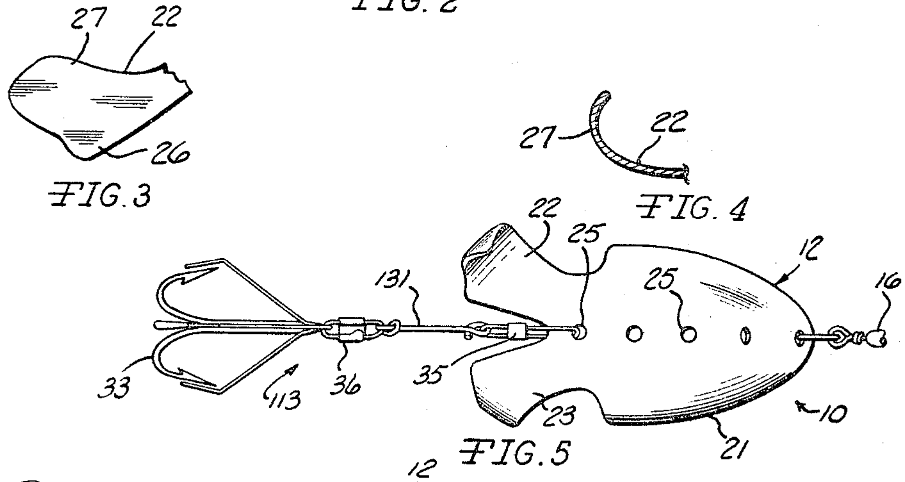
FIGURE 3 is a view showing the general configuration of a fin member of the fin portion disclosed in FIGURES 1 and 2 and shown in its flat form.
FIGURE 4 is a cross section showing the curvature incorporated in the fin members and taken along line IV—IV of FIGURE 1.
FIGURE 5 is a top plan view of the fish lure, similar to FIGURE 1, disclosing an alternate embodiment with an interchangeable fishhook assembly in accordance with the principles of the present invention.

Fins 22 and 23 take the form of a scoop, with fin 23 having a curve which blends in with the curvature of spoon member 21. Fin 22 has a scoop shape similar to fin 23, but in the opposite direction in reference to the curvature of spoon member 21. FIGURE 3 shows fin 22 as it would look in its flat form. Fin 22 has a flange portion 26 and a scoop portion 27. Referring generally to FIGURE 2, fin 23 has a flange portion 28 and a scoop portion 29. The flange portions 26 and 28 extend from scoop portions 27 and 29, respectively, toward the center line of spinner member 12 in a preferred embodiment. The fin portions 26 and 28 are used to create turbulence during the movement of the lure through the water. The full purpose of fins 22 and 23 will be discussed in more detail below.

Fishhook assembly 13 has a shaft 31 connected to spoon member 21 by a securing means 32. This could be accomplished by various means well known in the art, in the present illustration a spot weld is illustrated. Fishhooks 33 are secured at the opposite end of shaft 31 from spoon member 21. Shaft 31 is rigidly connected to the spoon 21 and positions the fishhooks 33 such a distance from the spoon 21, in a preferred embodiment, that the hooks 33 will not contact any portion of spinner member 12 regardless of what position the fishhooks 33 and the spinner member 12 move to.

Referring now to FIGURE 2, as the fish lure 10 is moved through the water, water will pass on both sides of spoon member 21. The water passing over spoon member 21 will contact fin 22 tending to move it down, and the water passing under spoon member 21 will contact fin 23 tending to move it up. This action causes spinner member 12 to rotate as it is drawn through the water. The shape of spoon member 21 causes fish lure 10 to rise as it is pulled through the water, and whether the fish lure 10 rises to the water's surface depends upon the rate it is pulled through the water. If the fisherman wishes to pull the fish lure 10 through the water at a faster than normal speed, but does not wish it to rise to the surface, he can add weights to fishing line or leader 15. These weights tend to hold the fish lure 10 underwater but are not necessary in normal usage. In some embodiments, spoon member 21 may be canted to cut or bite into the water as spinner member 12 is pulled through the water. This is illustrated in phantom in FIGURE 2. FIGURE 4 shows a cross section of fin 12 illustrating the curvature of a typical scoop portion.

FIGURE 5 illustrates a fish lure 10 having a fishhook assembly 113 which is not rigidly connected to spoon member 21, but is loosely connected by a retainer snap 35. Retainer snap 35 secures shaft 131 to the spoon 21 at the last hole 25. This allows various lengths of shaft 131 to be positioned on the fish lure 10 and also permits various fishhooks 33 to be attached to the fishing lure 10. A retainer snap 36 connects fishhooks 33 to shaft 131 or in some applications directly to spinner member 12 without a shaft. In some applications, shaft 131 may be rigidly connected to spoon member 21 and retainer snap 36 would be used independently, permitting interchangeability of fishhooks 33, depending upon the fish being hunted. In other applications, the retainer snap 36 may be omitted and retainer snap 35 would be used permitting interchangeability of the shaft 131 and the fishhooks 33 as a unit.

Figure 6:
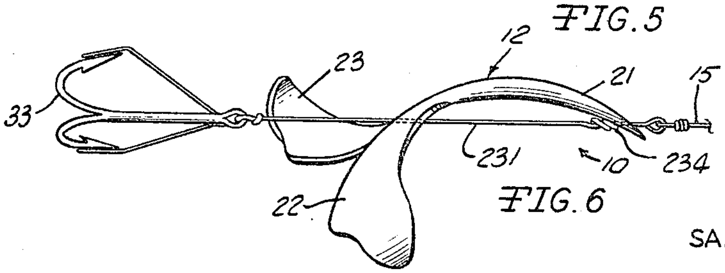
FIGURE 6 is a side elevational view of the fish lure, similar to FIGURE 2, disclosing an alternate embodiment with a spinning member free to rotate independent of the fishhook and fishhook assembly in accordance with the principles of the present invention.

FIGURE 6 illustrates a fish lure 10 having a spinner member 12 free to spin independent of a line shaft 231. In this illustration the line shaft 231 is connected directly to the fishing line 15. If desired, a swivel attachment could be placed between line shaft 231 and fishing line 15, similar to FIGURES 1 and 5. The spinner member 12 has a spoon 21 and fins 22 and 23 and functions as stated above for FIGURES 1 and 5. The line shaft 231 has fishhooks 33 connected at its opposite end from fishing line 15. A positioning means is located on line shaft 231, and in the illustration shown in FIGURE 6, a positioning knot 234 is used. This positioning knot 234 is larger than the hole 25, not shown, and prevents the spinner from moving back along line shaft 231 into contact with fishhooks 33.

When the fish lure 10 moves through the water as an underwater lure, fins 22 and 23 will send out sonic waves, as they turn through the water, which attract fish. In a preferred embodiment, holes 25 are provided, as stated above, substantially down the midportion of spoon 21. These holes will also send out a sonic wave. The combination of the fins 22 and 23 and holes 25 can be so formed as to send out a very appealing sonic wave which will readily attract game fish to the fish lure 10. When the fish lure 10 acts as a surface water lure, the spoon 21 will cause turbulence and the holes 25 will create both sonic waves and turbulence. The fins 22 and 23 will rise out of the water and then move back into the water as the spinner member 12 turns. The combination effect of the scoop members 27 and 29 rising out of the water and making a slight "slapping" sound when it re-enters the water gives the effect of fish feeding. This surface action produces a very appealing attraction for fish. The shape of fins 22 and 23, due to the flange portions 26 and 28 and scoop portions 27 and 29, contributes significantly to the sound and turbulence produced when the fish lure 10 is used as a surface lure.

While but several forms of the invention have been shown and described in detail, other forms within the spirit and scope of the invention will now be apparent to those skilled in the art. Therefore, the embodiments shown in the drawing are to be considered as merely set forth for illustrative purposes, and they are not intended to limit the scope of the invention herein described and shown.

Other modes of applying the principles of my invention may be employed instead of those explained, change being made as regards the article and combinations herein disclosed.

I therefore particularly point out and distinctly claim as my invention:

1. A fish lure comprising, in combination
(a) a spinner member,
(b) a means to attach said spinner member to a fishing line,
(c) a fish hook assembly connected to said spinner member,
(d) said spinner member having a longitudinally and transversely curved spoon member portion and a first and second trailing fin member,
(e) each said fin member having a scoop portion and a flange portion,
(f) said fin members being in diverging relationship with respect to each other in a direction away from the spoon member portion and having said scoop portions blending in with the said spoon member portion, each said flange portion extending inwardly from the inner edge of the corresponding one of said scoop portions,
(g) said flange portions causing tubulence during operation of said lure.

2. A fish lure as defined in claim 1, wherein
(a) at least three holes are provided substantially lengthwise along the midportion of said spoon member portion of said spinner member.

3. A fish lure as defined in claim 1, wherein
(a) said means attaching said fish lure to said fishing line is in the form of a swivel attachment,
(b) there is a line shaft extending through said spinner from said attaching means, and (c) said spinner member is mounted at opposite ends on said line shaft for free rotation around same.

4. A fish lure as defined in claim 2, wherein
(a) a line shaft is part of said fishhook assembly.
(b) a positioning means positioning said spinner member along said line shaft,
(c) said line shaft passes through two of said holes, and
(d) said spinner member turns independent of said fishhook assembly.

5. A fish lure as defined in claim 1 wherein
(a) a rigid shaft is solidly connected at one end to said spinner member as part of said fishhook assembly, and
(b) a fish hook is connected to the other end of said shaft.

6. A fish lure as defined in claim 1 wherein
(a) said fish hook assembly has a shaft member,
(b) means connecting one end of said shaft member to said spinner member, and
(c) a fish hook is secured to the other end of said shaft member by a first retainer snap.

7. A fish lure as defined in claim 6 wherein
(a) said shaft member connecting means includes a second retainer snap.

8. A fish lure as defined in claim 6 wherein at least three holes are provided substantially along the mid-portion of said spoon member portion of said spinner member.

References Cited

UNITED STATES PATENTS

| | | | |
|---|---|---|---|
| 580,915 | 4/1897 | Welch | 43—42.51 X |
| 1,273,425 | 7/1918 | Tuttle | 43—42.19 |
| 1,609,090 | 11/1926 | Knill | 43—42.06 |
| 1,943,283 | 1/1934 | Beil | 43—42.2 |
| 2,001,055 | 5/1935 | DeWitt | 43—42.06 |
| 3,143,825 | 8/1964 | Borgstrom | 43—42.06 X |

FOREIGN PATENTS

| | | |
|---|---|---|
| 262,197 | 9/1949 | Switzerland. |

SAMUEL KOREN, *Primary Examiner.*

DANIEL J. LEACH, *Assistant Examiner.*

U.S. Cl. X.R.

43—42.06, 42.2, 42.31, 42.51